US012794287B2

(12) United States Patent
Ito et al.

(10) Patent No.: US 12,794,287 B2
(45) Date of Patent: Nov. 10, 2026

(54) MAGNET, ELECTRIC MOTOR, AND METHOD OF MANUFACTURING MAGNET

(71) Applicant: SINFONIA TECHNOLOGY CO., LTD., Tokyo (JP)

(72) Inventors: Akihiro Ito, Tokyo (JP); Nobuo Aruga, Tokyo (JP); Tatsuya Nemoto, Tokyo (JP); Tokio Morohoshi, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 335 days.

(21) Appl. No.: 18/106,654

(22) Filed: Feb. 7, 2023

(65) Prior Publication Data

US 2023/0253842 A1 Aug. 10, 2023

(30) Foreign Application Priority Data

Feb. 9, 2022 (JP) ................................ 2022-019056

(51) Int. Cl.
*H02K 1/2783* (2022.01)
*H01F 7/02* (2006.01)
(Continued)

(52) U.S. Cl.
CPC ....... *H02K 1/2766* (2013.01); *H01F 41/0253* (2013.01); *H02K 1/2783* (2022.01); *H02K 41/02* (2013.01)

(58) Field of Classification Search
CPC . H01F 7/21; H01F 7/0215; H01F 7/02; H01F 41/0253; H02K 1/2792;
(Continued)

(56) References Cited

U.S. PATENT DOCUMENTS 3,454,913 A * 7/1969 Israelson ............... B03C 1/0332
335/306
4,185,262 A 1/1980 Watanabe et al.
(Continued)

FOREIGN PATENT DOCUMENTS

CN 201766425 U 3/2011
DE 10330418 B4 4/2007
(Continued)

OTHER PUBLICATIONS

Extended European Search Report dated Jun. 29, 2023, issued in counterpart application No. 23154677.1. (17 pages).
(Continued)

*Primary Examiner* — Burton S Mullins
(74) *Attorney, Agent, or Firm* — WHDA, LLP

(57) ABSTRACT

Provided is a magnet that allows the orientation direction of main and auxiliary pole pieces to be set precisely and enables easy fabrication of flux focusing permanent magnet units having a high magnetic flux density. A magnet 22 includes permanent magnet units 22*a* each including a main pole piece 221 and auxiliary pole pieces 222. The main pole piece 221 is composed of permanent magnet sheets 221*a* with substantially the same thickness stacked in the thickness direction. The auxiliary pole pieces 222 are composed of permanent magnet sheets 222*a* with substantially the same thickness stacked in the thickness direction and arranged at positions adjacent to the main pole piece 221 with orientation directions different from the orientation direction of the main pole piece 221 thereby to focus the magnetic flux at the main pole piece 221.

6 Claims, 12 Drawing Sheets

(51) Int. Cl.

| | |
|---|---|
| ***H01F 41/02*** | (2006.01) |
| ***H02K 1/276*** | (2022.01) |
| ***H02K 41/02*** | (2006.01) |

(58) Field of Classification Search

CPC .... H02K 1/2783; H02K 1/2766; H02K 41/02; B22F 5/006

USPC ...................................... 310/156.43; 335/306

See application file for complete search history.

(56) References Cited

U.S. PATENT DOCUMENTS

| | | | | |
|---|---|---|---|---|
| 4,536,230 | A * | 8/1985 | Landa | H01F 7/021 148/303 |
| 4,538,130 | A * | 8/1985 | Gluckstern | H01F 7/0278 335/298 |
| 5,184,395 | A | 2/1993 | Pan et al. | |
| 5,300,910 | A | 4/1994 | Unkelbach et al. | |
| 7,965,010 | B2 * | 6/2011 | Froeschle | H02K 41/031 310/156.43 |
| 8,269,392 | B2 * | 9/2012 | Doi | H02K 1/2781 310/156.56 |
| 8,400,038 | B2 * | 3/2013 | Smith | H02K 1/2766 310/156.43 |
| 8,446,054 | B2 * | 5/2013 | Toyota | H02K 41/031 310/156.43 |
| 11,101,707 | B2 * | 8/2021 | Fujihara | C22C 38/005 |
| 11,894,719 | B2 * | 2/2024 | Rong | H02K 1/276 |
| 2002/0180295 | A1 * | 12/2002 | Kaneda | H02K 1/2783 310/156.43 |
| 2011/0068651 | A1 | 3/2011 | Miyata et al. | |
| 2012/0119861 | A1 * | 5/2012 | Tang | H01F 7/0278 335/306 |
| 2020/0358345 | A1 | 11/2020 | Gbadeyan et al. | |
| 2020/0381984 | A1 | 12/2020 | Sercombe et al. | |

FOREIGN PATENT DOCUMENTS

| | | | | |
|---|---|---|---|---|
| DE | 102018212764 | A1 | 2/2020 | |
| EP | 2697895 | B1 | 9/2019 | |
| JP | H11-4555 | A | 1/1999 | |
| JP | 2006-320109 | A | 11/2006 | |
| JP | 2010-50440 | A | 3/2010 | |
| JP | 2020-078189 | A | 5/2020 | |
| JP | 2021-078208 | A | 5/2021 | |
| WO | 2019/131912 | A1 | 7/2019 | |
| WO | WO 2020025530 | A1 * | 2/2020 | H02K 15/03 |

OTHER PUBLICATIONS

Office Communication dated Jul. 29, 2024, issued in counterpart EP Application No. 23154677.1. (15 pages).

Office Action dated Oct. 21, 2025, issued in counterpart JP Application No. 2022-019056, with English translation. (12 pages).

Office Action dated Mar. 16, 2026, issued in counterpart EP Application No. 23154677.1. (9 pages).

Office Action dated Apr. 7, 2026, issued in counterpart JP Application No. 2022-019056, with English translation. (9 pages).

* cited by examiner

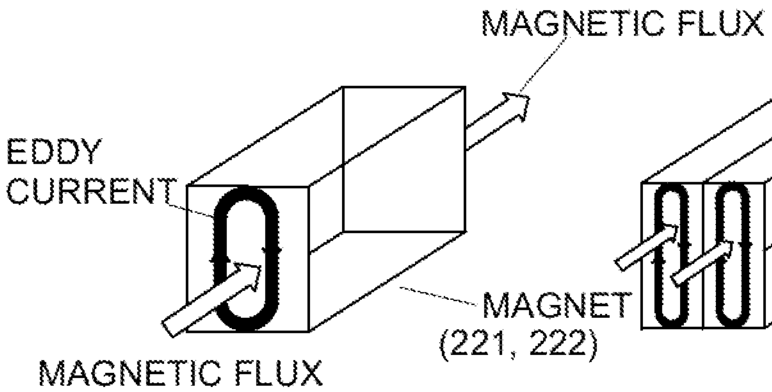
FIG.3A NO STACKING
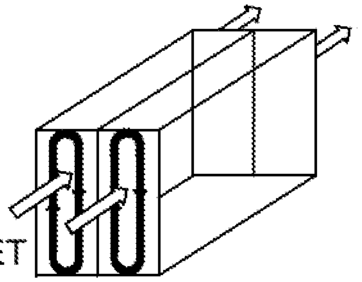
FIG.3B STACKED
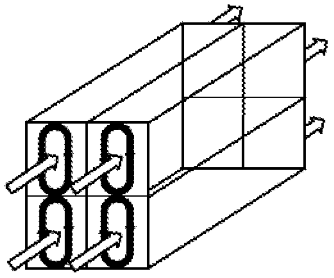
FIG.3C STACKING AND DIVIDING
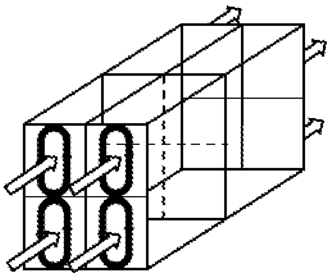
FIG.3D DIVIDING IN AXIAL DIRECTION CUT OUT MAGNET SHEET
221a(222a)

STACK AND BOND MAGNET SHEET
221a(222a)
FIG.4C1
221
x1
221a
221
FIG.4C2
CUT OUT AUXILIARY
POLE PIECES
222a
222
x2
222

BONDING OF MAIN POLE
AND AUXILIARY POLE PIECES
22a
222
221
222
222
221
222

FIG.10A1
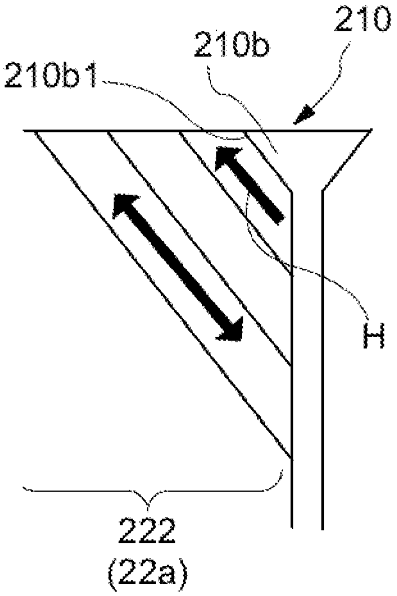
FIG.10A2
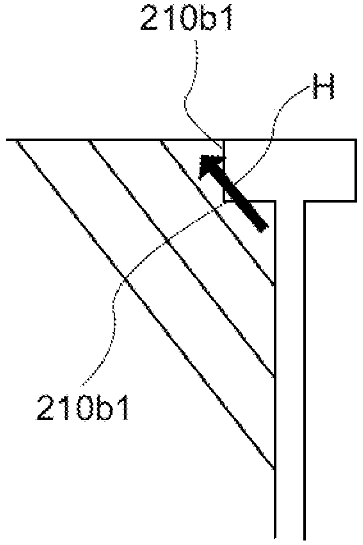
FIG.10B
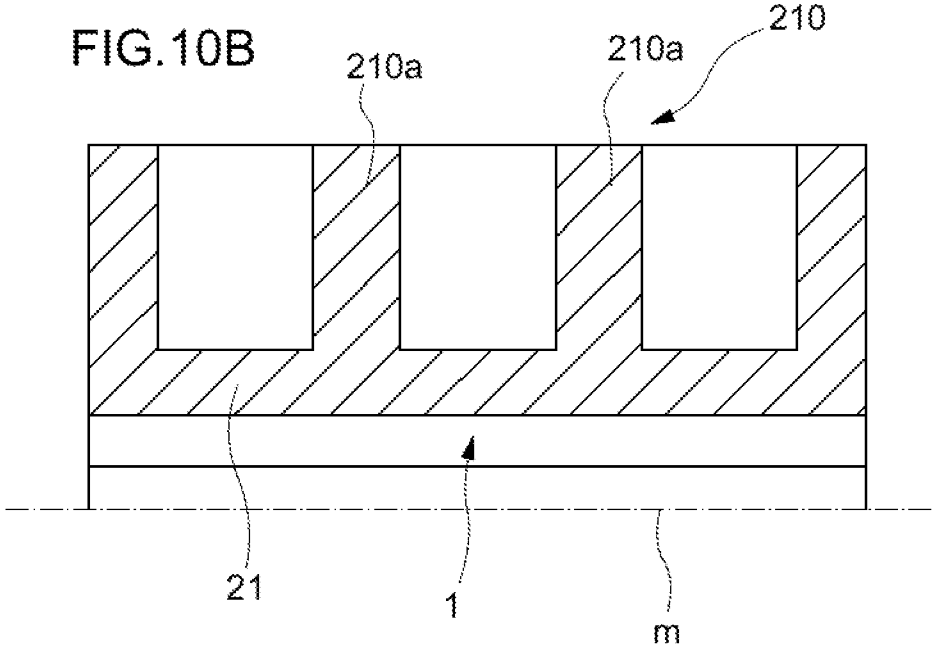

MAGNET, ELECTRIC MOTOR, AND METHOD OF MANUFACTURING MAGNET

CROSS-REFERENCE TO RELATED APPLICATIONS

This application claims priority of Japanese Patent Applications No. 2022-019056 filed on Feb. 9, 2022. The contents of the applications are incorporated herein by reference in their entirety.

BACKGROUND

Field of the Invention

The present invention relates to a magnetic flux concentrating magnet having high magnetic flux density, such as a Halbach array magnet, an electric motor, and a method of manufacturing a magnet.

Description of the Related Documents

Conventionally, Halbach array magnets applied to rotors of permanent magnet motors have been known as magnets having high magnetic flux density (for example, Japanese Unexamined Patent Publication No. 2006-320109).

Unlike parallel orientation magnets, in a Halbach array, permanent magnets of different orientation directions are arranged so that the magnetic flux is focused to the center of the poles, to increase the magnetic flux density in the gap surface between the rotor and stator.

Conventionally, to fabricate magnets having such a structure, a permanent magnet mass of specified dimensions and orientation is made for each main pole oriented in the radial direction and each auxiliary pole piece oriented in the main pole direction, and, for example, in the case of an inner rotor, these main and auxiliary pole pieces are assembled by bonding them to the outer periphery of a rotor core of a rotor. In the case of an outer rotor, these main and auxiliary pole pieces are assembled by bonding them to the inner periphery of a rotor core.

PRIOR ART DOCUMENT

Patent Document

Patent Document 1: JP 2006-320109 A

However, when the main and auxiliary pole pieces are each constituted of a permanent magnet mass, it is difficult to align the orientation direction uniformly throughout the interior of all main pole pieces and all auxiliary pole pieces.

Furthermore, large eddy currents flow through main and auxiliary pole pieces made of permanent magnet masses, and prevents the motor from achieving high power density.

Furthermore, since each permanent magnet has to be fabricated by preparing a permanent magnet block and cutting the permanent magnet block into predetermined sizes as needed, productivity is poor.

An object of the present invention, which has been made with the above problems in mind, is to provide magnets, a motor, and a method of manufacturing magnets that enables easy fabrication of permanent magnet units having high magnetic flux density by highly precisely setting the orientation directions of main and auxiliary pole pieces thereby to focus the magnetic flux.

SUMMARY

The present invention adopts the following means to achieve such an object.

That is, a magnet of the present invention includes permanent magnet units each including a main pole piece and an auxiliary pole piece. The main pole piece is composed of permanent magnet sheets with substantially the same thickness stacked in the thickness direction. The auxiliary pole pieces are composed of permanent magnet sheets with substantially the same thickness stacked in the thickness direction and arranged at positions adjacent to the main pole piece with orientation directions different from an orientation direction of the main pole piece thereby to focus the magnetic flux at the main pole piece.

Here, the dimension in the stacking direction of the permanent magnet sheets is simply referred to as the thickness and the stacking direction as the thickness direction. Therefore, the thickness direction here is not necessarily in a univocal relationship with the geometric thickness direction or magnetization direction of the main and auxiliary pole pieces.

In this way, by adopting main pole pieces and auxiliary pole pieces having a stacked structure of permanent magnet sheets, the orientation directions can be set more accurately than the main pole pieces and auxiliary pole pieces composed of lumps of permanent magnets, and a flux focusing type permanent magnet unit having a high magnetic flux density can be easily and appropriately fabricated. Moreover, since the surface generating eddy current loss become small, the eddy current loss is reduced, and the resulting temperature drop achieves a high magnetic flux density. Thus, when applied to motors and the like, further miniaturization and higher output can be achieved.

It is preferred that the permanent magnet sheets of the main pole piece and the permanent magnet sheets of the auxiliary pole piece have a same orientation direction.

It is preferred that the permanent magnet sheets of the main pole piece and the permanent magnet sheets of the auxiliary pole piece have a same thickness direction.

In this way, variations in the magnetic properties of the main and auxiliary pole pieces due to machining can be suppressed.

It is preferred that at least one of the main pole piece and the auxiliary pole piece be further divided in a direction orthogonal to a thickness direction.

The division in the direction perpendicular to the thickness direction also further reduces the surface on which eddy current losses are generated.

It is preferred that the permanent magnet unit be provided for each pole, be positioned along a thrust generation direction, and includes, in a portion of a core being a thrust generation element, a magnet holder including a wall-shaped part extending in a direction orthogonal to the thrust generation direction between the permanent magnet units, and an enlarged part extending from an end of the wall-shaped part in a direction overlaying a corner portion on an end side of each of the permanent magnet units.

The structure to hold the permanent magnet unit in the enlarged part allows the permanent magnet to be held only by the magnetic circuit components of the motor. By providing the chamfered parts at the corner portions of the auxiliary pole pieces of the permanent magnet unit to accommodate the enlarged part, it is possible to avoid an increase in the gap length between the stator and the mover when applied to motors and the like. When the corner portions are held down by the enlarged part, flux leakage through the enlarged part is reduced in the case of a flux focusing magnet such as a Halbach array magnet compared with a parallel orientation magnet. Therefore, a reduction in the magnetic flux density can be avoided.

If the above magnet is provided in the rotor of an electric motor, a multipole surface magnet type rotor with high torque and high efficiency can be appropriately structured in a compact and lightweight design.

A method of manufacturing a magnet according to the present invention include constructing, a main pole piece and auxiliary pole pieces. The main pole piece is constructed by cutting a stacked body made by stacking the permanent magnet sheets in a predetermined direction. The auxiliary pole pieces are constructed by cutting a stacked body made by stacking the permanent magnet sheets having an orientation direction that is the same as that of the permanent magnet sheets of the main pole piece in a different direction so that the auxiliary pole pieces have an orientation direction different from that of the main pole piece when assembled at positions adjacent to the main pole piece.

In this way, the main pole piece and the auxiliary pole pieces having small eddy current losses and different orientation directions can be easily fabricated in a similar fabrication process.

According to the present invention described above, it is possible to provide a magnet, an electric motor, and a method of manufacturing a magnet that allow the orientation direction of main and auxiliary poles to be set precisely and enable easy fabrication of flux focusing permanent magnet units with high magnetic flux density.

BRIEF DESCRIPTION OF THE DRAWINGS

FIGS. 3A to 3D illustrate the eddy currents generated in the permanent magnet unit.

FIGS. 4A to 4D illustrate a method of manufacturing the permanent magnet unit.

FIGS. 10A1 to 10B illustrate another modification of the present invention.

DETAILED DESCRIPTION

An embodiment of the present invention will be described below with reference to the drawings.

Figure 1A:
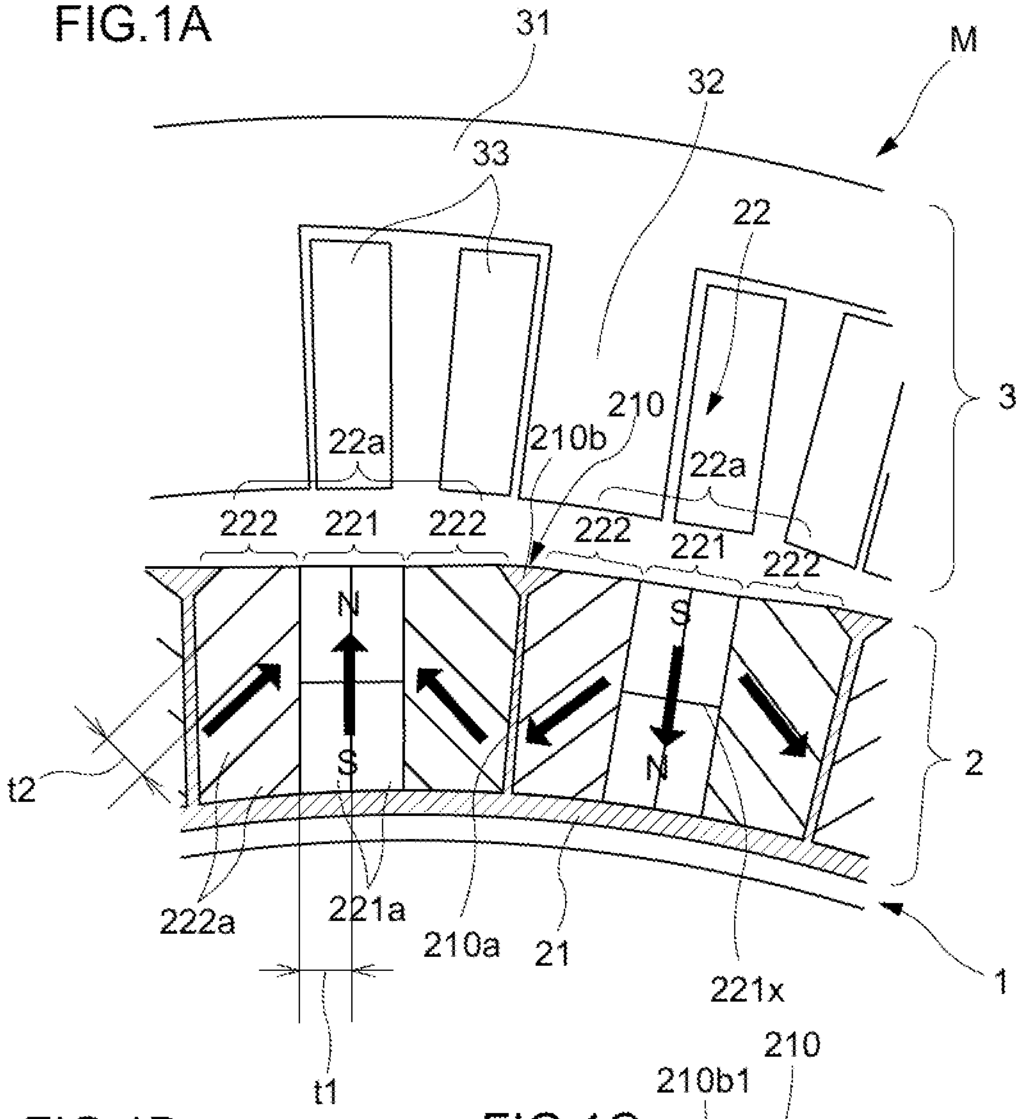
FIGS. 1A to 1C are partially enlarged cross-sectional views of an electric motor including magnets according to an embodiment of the present invention.
Figure 1B:
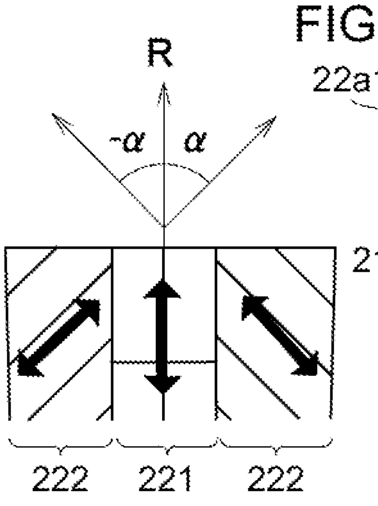
Figure 1C:
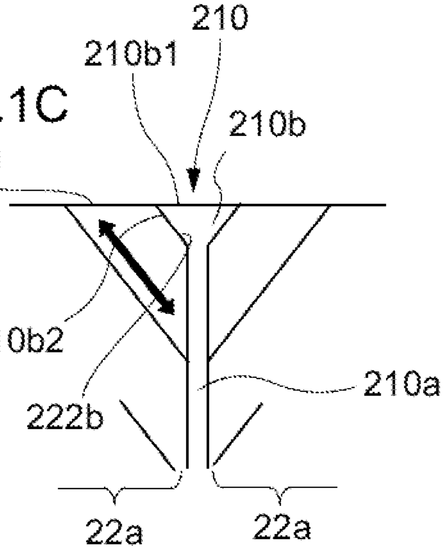

FIG. 1 illustrates an example of an application of the magnets according to the present invention to an electric motor or a motor M.

As illustrate in FIG. 1A, the motor M is an inner rotor type rotary electric machine including a shaft 1 provided with a rotor 2 or a mover that can rotate together with the shaft 1 and a stator 3 positioned around the outer periphery of the rotor 2.

The stator 3 includes a substantially cylindrical stator core 31, teeth 32 that are formed integrally on the stator core 31 at equal angular positions and extend toward the inner circumference, and coils 33 wound around the respective teeth 32. The coils 33 are connected to a power supply device (not illustrated) and generate a rotating magnetic field to rotate the rotor 2 by feeding power.

The rotor 2 is positioned on the inner circumference side of the stator 3 with a predetermined gap therebetween. The rotor 2 includes a substantially cylindrical rotor core 21 and a permanent magnet 22 positioned along the outer circumference of the rotor core 21.

The permanent magnet 22 is constructed in an annular shape by arranging a number of one-pole permanent magnet units 22*a* corresponding to the number of poles in the thrust generation direction, that is, in the circumferential direction of the rotor core 21. Each permanent magnet unit 22*a* consists of a main pole piece 221 and auxiliary pole pieces 222. As illustrated in FIG. 1B, the permanent magnet units 22*a* constitute a flux focusing magnet such as a Halbach array magnet. The main pole piece 221 is arranged so that the orientation direction indicated by the bold arrow points in the radial direction (R direction), which is the direction orthogonal to the thrust generation direction, while the auxiliary pole pieces 222 are arranged on both sides of the main pole piece 221 so that the orientation directions indicated by the bold arrows point toward the main pole piece 221, that is, in the direction at a predetermined angle ($\pm\alpha$, where $\alpha$ is preferably an acute angle) to the radial direction. The orientation direction refers to the direction in which magnetization is easy. The permanent magnet is magnetized along the orientation directions. In FIG. 1 and other drawings, the orientation direction is indicated by a double-headed arrow, and the magnetization direction is indicated by a single-headed arrow.

The motor M of the present embodiment includes permanent magnet units 22*a* each including one main pole piece and two auxiliary pole pieces, and a multipole surface magnet type rotor 2 including a number of permanent magnet units 22*a* corresponding to the number of poles of the motor M.

The above permanent magnet arrangement provides a flux focusing magnet 22 such as a Halbach array magnet in which the magnetic flux is readily focused at the main pole pieces 221 compared to a parallel orientation magnet.

A permanent magnet motor has increased magnetic flux density, but also has eddy currents increased in proportion to the square of the magnetic flux due to armature reaction and the excitation frequency. Therefore, when the excitation frequency is increased to radio frequency or the magnetic flux is increased by increasing the current to increase the power density of the motor M, the accompanying increase in eddy currents becomes a problem. Increased eddy current losses lead to heat generation in the magnet 22 and reduced motor efficiency.

Accordingly, the present embodiment adopts a novel structure for the main pole piece 221 and the auxiliary pole pieces 222 in which multiple permanent magnet sheets 221*a* and 222*a* having the same orientation direction are stacked and divided in a direction different from the stacking direction to obtain the main pole pieces 221 and the auxiliary pole pieces 222, as necessary.

Specifically, the main pole piece 221 is constructed by stacking permanent magnet sheets 221*a* each having substantially the same thickness t1 in the circumferential direction orthogonal to the orientation direction (R±90 degrees), and each of the auxiliary pole pieces 222 is constructed by stacking permanent magnet sheets 222*a* having substantially the same thickness t2 in a direction orthogonal to the orientation direction (±α±90 degrees). In the present embodiment, the permanent magnet sheets 221*a* and 222*a* are made of the same material, and their external dimensions are substantially identical, including their thicknesses t1 and t2. Even when the thicknesses t1 and t2 are different, the effect of adopting a stacked structure or divided structure is the same.

Figure 2:
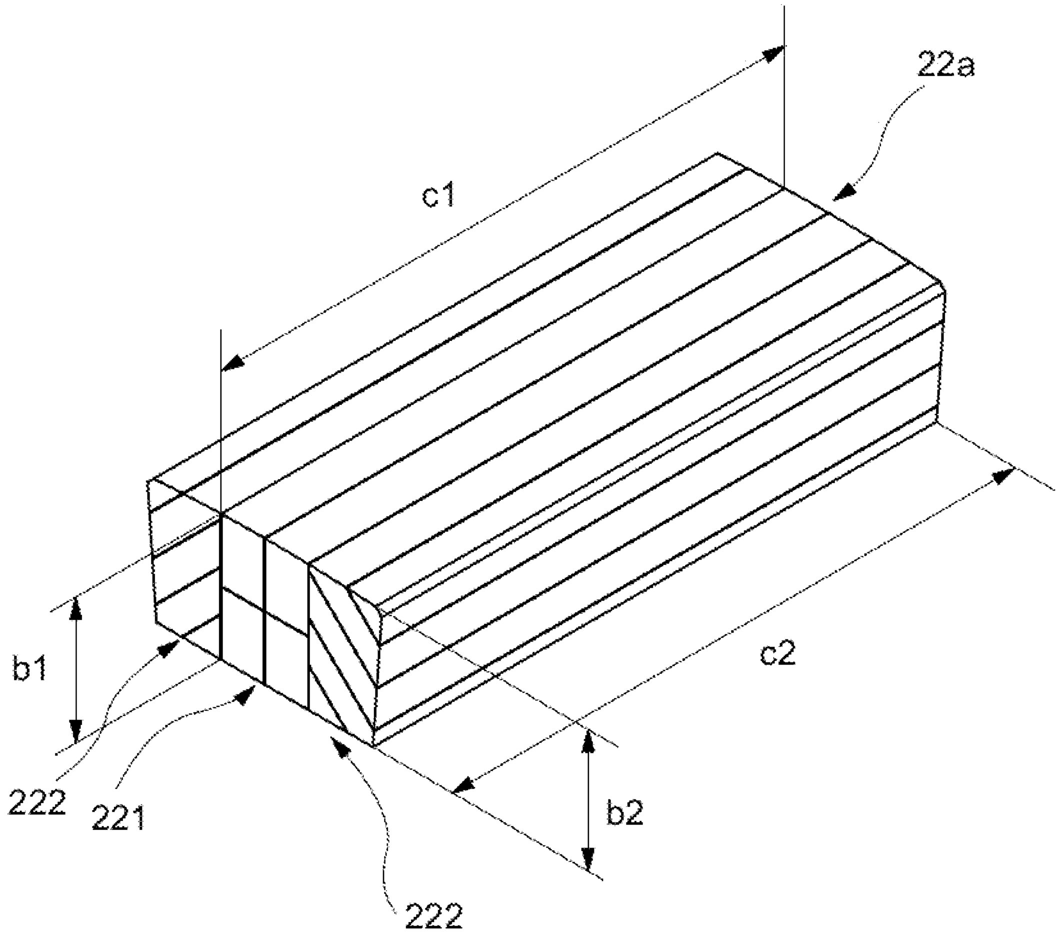
FIG. 2 is a perspective view of a permanent magnet unit of a magnet in FIG. 1.

FIG. 2 illustrates the dimensional relationship between the main pole piece 221 and the auxiliary pole pieces 222. The longitudinal dimensions b1 and b2 of the main pole piece 221 and the auxiliary pole pieces 222, and the axial dimensions c1 and c2 of the main pole piece 221 and the auxiliary pole pieces 222 are set to be substantially identical (identical or approximately identical) to each other.

As illustrated in FIG. 1, the main pole piece 221 is further divided equally by a dividing surface 221*x* in a direction (radial direction) orthogonal to the thickness direction of the permanent magnet sheets 221*a*. In the illustrated example, the main pole piece 221 is divided in halves, but the main pole piece 221 may be divided into any number of sections. Although not illustrated, the auxiliary pole pieces 222 may also be divided in a similar manner.

In the permanent magnet having a stacked structure as illustrated in FIG. 3B, eddy currents flow through cross-sections that are each smaller than the cross-section of a mass of permanent magnet (main pole piece 221 and auxiliary pole pieces 222) illustrated in FIG. 3A through which an eddy current flows. By further dividing the permanent magnet as in FIG. 3C, the cross-sections through which the eddy currents flow becomes even smaller. As a result, the eddy current loss is smaller in the structure in FIG. 3B than in structure in FIG. 3A, and even smaller in the structure in FIG. 3C. This results in less heat generation in the magnet 22 and lower motor efficiency, thereby allowing greater currents to flow. Therefore, it is possible to increase the power density of the motor through an increase in excitation frequency by multipolarity.

As illustrated in FIG. 3D, the permanent magnet can be divided into multiple sections in the axial direction as well.

To achieve such a stacked structure of a main pole piece 221 and auxiliary pole pieces 222, the present embodiment adopts a method of manufacturing a magnet illustrated in FIG. 4.

Figures 4A, 4B, 4D:
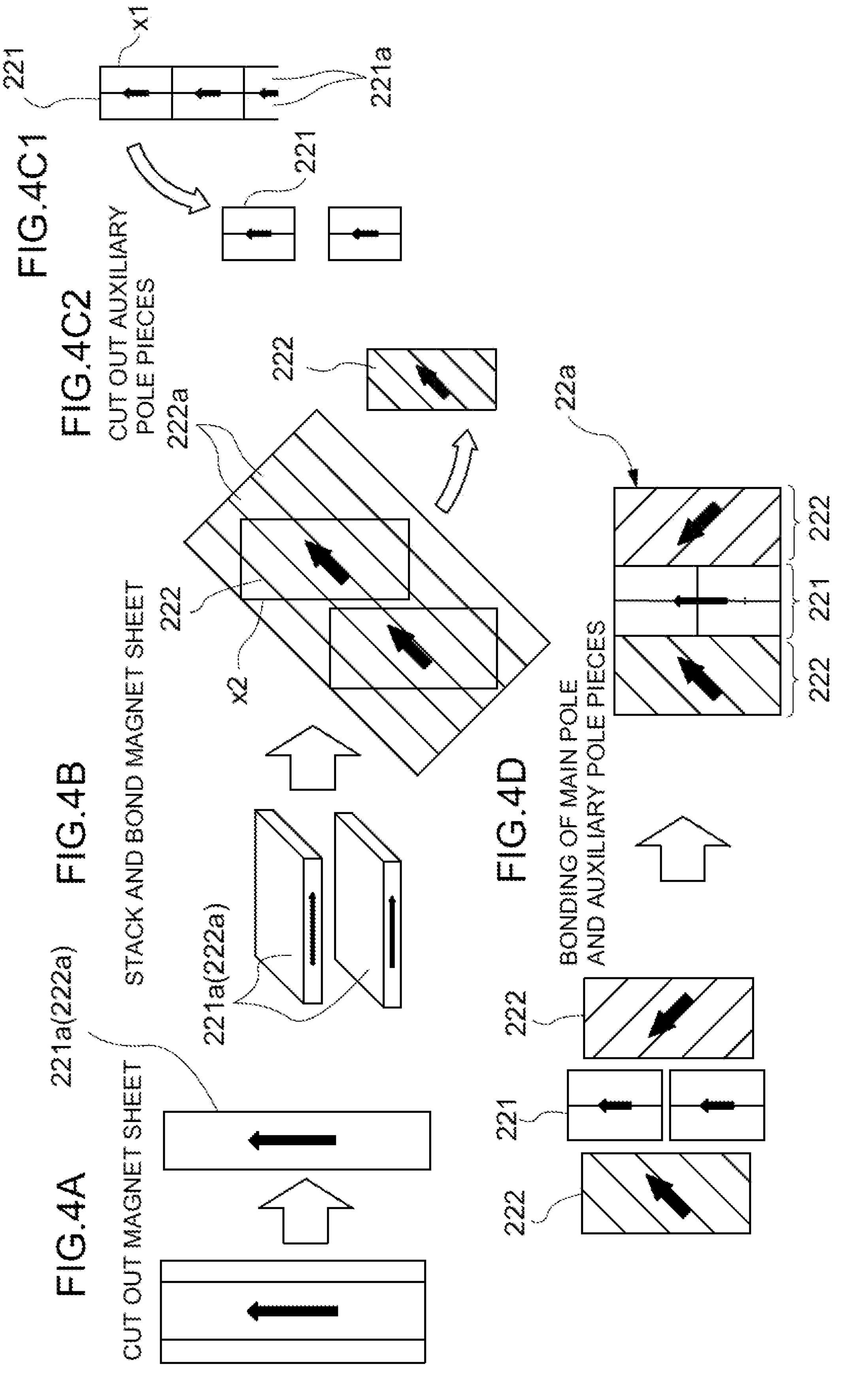

First, as illustrated in FIG. 4A, thin permanent magnet sheets 221*a* (222*a*) are cut out from the permanent magnet block. After the permanent magnet sheets 221*a* (222*a*) are bonded together, as illustrated in FIG. 4B, main pole pieces 221 are cut out from the stacked body of the permanent magnet sheets 221*a*, as illustrated in FIG. 4C1, and auxiliary pole pieces 222 are cut out from the stacked body of the permanent magnet sheets 222*a*, as illustrated in FIG. 4C2.

To obtained a main pole piece 221, a quadrangle x1 having two sides extending along the stacking direction is obtained by cutting the stacked body from the small end direction. To obtained an auxiliary pole piece 222, a quadrangle x2 oblique to the stacking direction is obtained by cutting the stacked body from the small end direction.

Then, as illustrated in FIG. 4D, the main pole pieces 221 and the auxiliary pole pieces 222 are bonded together. Two main pole pieces 221 are bonded together to form one main pole piece 221 divided into two sections in the orientation direction. The number of divisions is only an example.

If a permanent magnet (main pole pieces 221 and auxiliary pole pieces 222) having different orientation directions can be made with one type of finishing jig, only one type of finishing jig will be needed, and the cost of making magnets including mold and processing costs can be reduced.

Figures 5A, 5B, 5C:
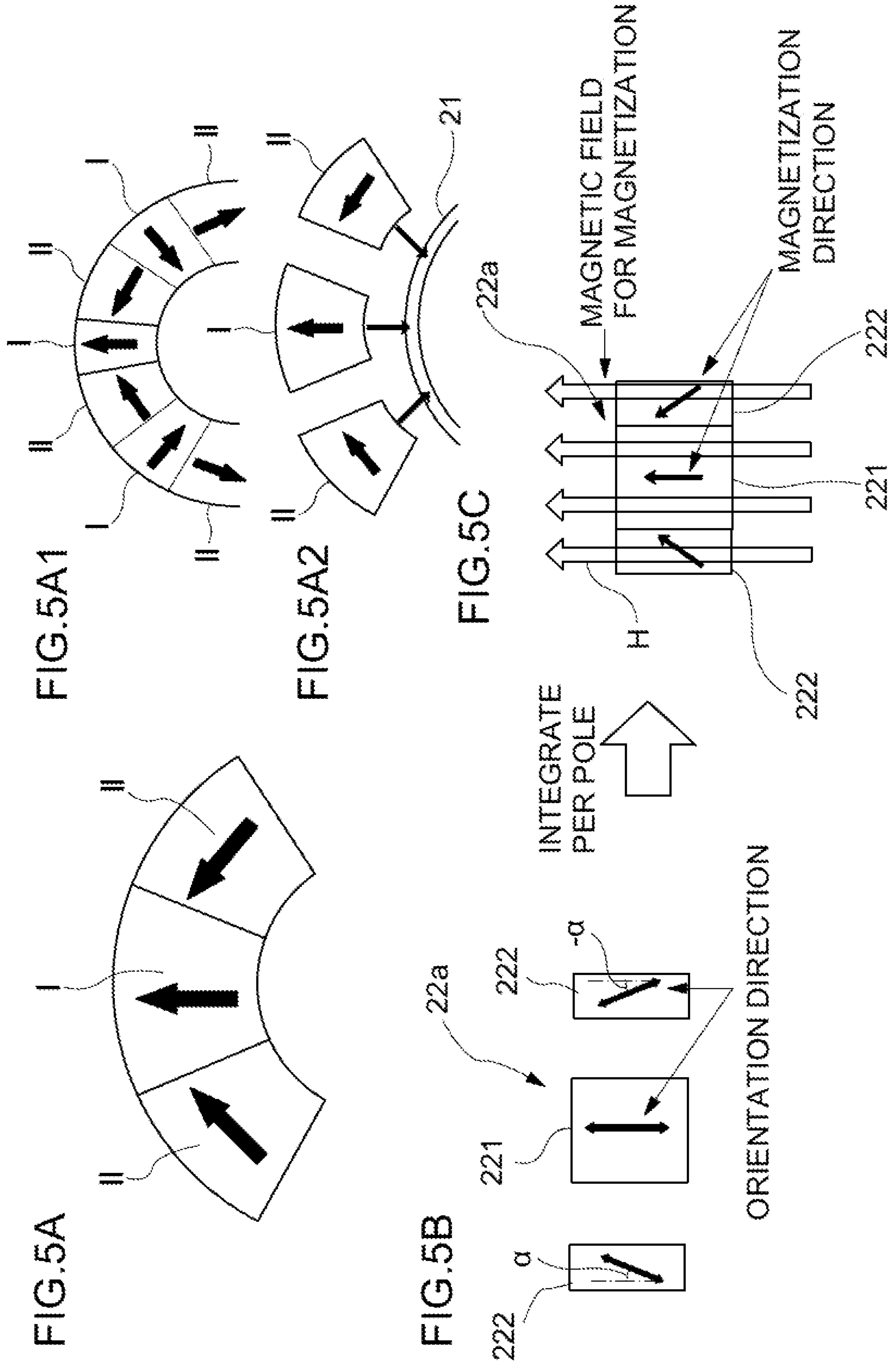
FIGS. 5A to 5C illustrate a method of manufacturing magnets according to the embodiment.

With regard to a magnetization process, as in the case of a conventional Halbach array magnet illustrated in FIG. 5A, if a main pole piece I orientated in the radial direction of a rotor 2 and auxiliary pole pieces II oriented in the circumferential direction of the rotor 2 are integrated, the orientation direction of the permanent magnet is not parallel to the magnetic field generated by magnetization coils. Consequently, a magnetic field appropriately passing through the main pole piece I and the auxiliary pole pieces II cannot be generated for magnetization of the permanent magnet.

In particular, in a multipole structure illustrated in FIG. 5A1, a magnetic field that passes through all of the main pole pieces I and the auxiliary pole pieces II with different orientation directions needs to be generated. As a result, it is difficult to fabricate coils that can generate such a magnetic field for magnetization.

In contrast, as illustrated in FIG. 5A2, if the main pole pieces I and the auxiliary pole pieces II are to be magnetized individually, the number of steps for magnetization increases. Also, during bonding of the main pole pieces I and the auxiliary pole pieces II to a rotor core 21, the magnetic attractive force and the repulsive force of the main pole pieces I and the auxiliary pole pieces II are intense and frequently cause an effect that makes the bonding process difficult.

Therefore, as illustrated in FIG. 5B, the orientation directions of the auxiliary pole pieces 222 are set to acute angles fa to the orientation direction of the main pole piece 221. Then, as illustrated in FIG. 5C, the unmagnetized main pole piece 221 and auxiliary pole pieces 222 are bonded together to form a one-pole permanent magnet unit 22*a*. Finally, a magnetic field for magnetization is applied to each permanent magnet unit 22*a*.

Figure 6B:
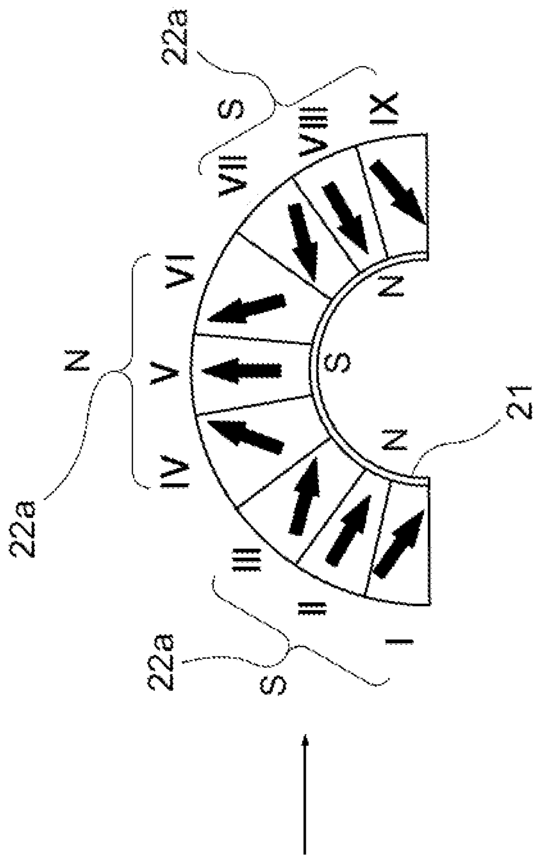
FIGS. 6A and 6B illustrate a method of manufacturing the magnets.
Figure 6A:
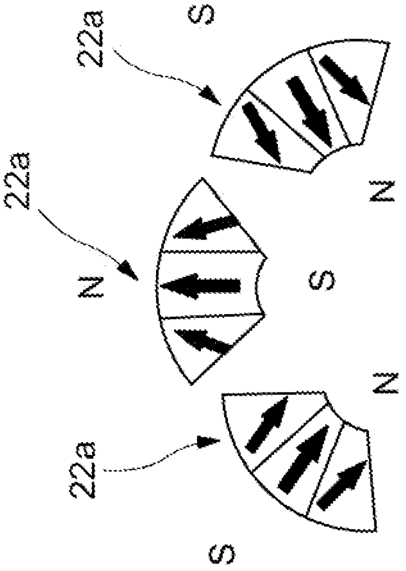

The shape of the permanent magnet unit 22*a* in FIG. 5C is actually the fan shape illustrated in FIG. 6A since the permanent magnet unit 22*a* is arranged around the rotor core 21.

FIG. 6A illustrates each permanent magnet unit 22*a*, i.e., one main pole piece 221 and two auxiliary pole pieces 222 being magnetized individually. Adjacent permanent magnet units 22*a* are magnetized so that their S and N poles are opposite to each other. These permanent magnet units 22*a* are bonded to the rotor core 21 to achieve the bonding state illustrated in FIG. 6B.

This eliminates the trouble of magnetization and the magnetic influence between the permanent magnets, such as when each of the permanent magnets I to IX is magnetized before being bonded to the rotor core 21. This also eliminates the problem of generating an intense magnetic flux for magnetization, such as when all permanent magnets I to IX are magnetized at once after being bonded to the rotor core 21. As a result, the permanent magnets I to IX can be magnetized with an appropriate magnetic flux, and since the permanent magnet units 22*a* have already been bonded to the rotor core 21 one by one, there is only the influence of the magnetic effect between the permanent magnet units 22*a* and 22*a*, and the influence of magnetic attractive force and repulsion can be reduced as much as possible.

The permanent magnet units 22*a* each consisting of a main pole piece 221 and auxiliary pole pieces 222 are held in a magnet holder 210 of the rotor core 21 illustrated in FIG. 1. The magnet holder 210 has a wall-shaped part 210*a* and an enlarged part 210*b*. The wall-shaped part 210*a* is a single unit that protrudes from the cylindrical rotor core 21 at equal intervals in the radial direction orthogonal to the thrust generation direction and extends between the permanent magnet units 22*a* to the vicinity of the gap between the stator 3 and the rotor 2. The enlarged part 210*b* extends in the circumferential direction (in the direction forming a T-shape) of the rotor core 21 from the tip of the wall-shaped part 210*a* so as to overlay the corners of the auxiliary pole pieces 222 at the edge of the permanent magnet unit 22*a*. The enlarged part 210*b* mechanically holds the corners of the auxiliary pole pieces 222 of adjacent permanent magnet units 22*a* and 22*a* in the radial direction. The wall-shaped part 210*a* may serve to hold the permanent magnet units 22*a* in the circumferential direction.

In such a case, chamfered parts 222*b* are provided on the corner portions at the edges of the auxiliary pole pieces 222, and the enlarged part 210*b* is shaped along the chamfered parts 222*b* so that the outer circumferential surfaces 22*a* 1 of the permanent magnet units 22*a* and the outer circumferential surface 210*b*1 of the enlarged part 210*b* are substantially flush. The chamfered parts 222*b* are surfaces tilting in the orientation directions of the auxiliary pole pieces 222 of the permanent magnet unit 22*a*, and the enlarged part 210*b* is tapered and shaped as an inverted triangle.

Figures 7A, 7B, 7C:
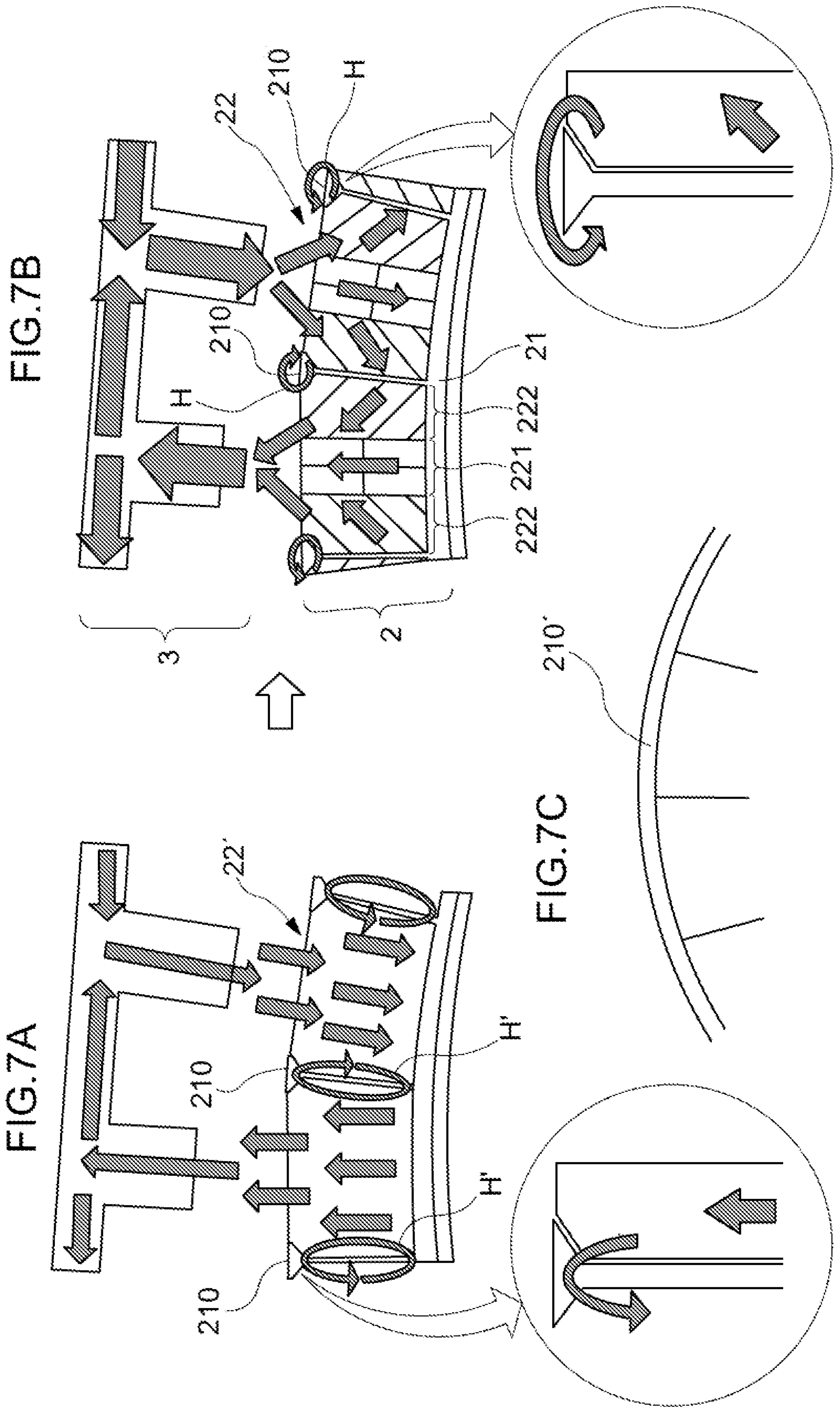
FIGS. 7A to 7C illustrate the magnetic flux flow generated in the magnets together and a comparative example.

In the case of a parallel orientation magnet 22' in FIG. 7A, short-circuiting through the magnet holder 210 is likely to occur by providing the magnet holders 210. In contrast, in the case of the flux focusing magnet 22 illustrated in FIG. 7B, holding by the magnet holders 210 having an enlarged part along the orientation direction causes the orientation directions of the auxiliary pole pieces to tilt toward the center of the magnetic pole even with the magnet holders 210, thereby preventing short circuiting through the magnet holder 210 and reducing magnetic flux leakage.

By holding the magnet 22 in this way with the magnet holders 210 that forms an integral part of the rotor core 21, the magnet 22 can be mechanically held by only the magnetic circuit components of the motor M. As a result, a cylindrical magnet holder part 210' as illustrated in FIG. 7C is not needed. Since the enlarged part 210*b* is accommodated in the chamfered parts 222*b*, the gap length between the stator 3 and the rotor 2 is reduced, as illustrated in FIG. 1, to achieve the effect of increasing the fundamental wave component of the magnetic flux density due to the magnet 22.

As it is apparent from the original magnetic flux (parallel magnetic flux) other than the short-circuit magnetic flux H' illustrated in FIG. 7A and the original magnetic flux (magnetic flux consisting of the main pole pieces 221 and the auxiliary pole pieces 222) other than the short-circuit magnetic flux H illustrated in FIG. 7B under the magnetic flux focusing structure such as a Halbach array, the effect of an increase in the fundamental wave component of the magnetic flux density due to the magnet 22 is achieved also by shifting the original magnetic flux toward the pole center.

When the fundamental wave component of the magnetic flux density by the magnet 22 increases in a motor having the same size and current due to the effect of the above two points, the torque increases because the torque is proportional to the product of the fundamental wave of the in-slot current, the fundamental wave of the magnetic flux density, and the motor product thickness.

When the magnetic flux density by the magnet 22 increases in a motor having the same size and torque due to the effect of the above two points, the current decreases and the copper loss decreases because the copper loss is proportional to the product of the square of the in-slot current and the winding resistance. Since a reduction in copper losses causes a reduction in motor input, such a reduction leads to an increase in motor efficiency or the ratio of output to input.

Furthermore, an increase in the magnetic flux density by the magnet 22 in a motor having the same size and current due to the effect of the above two points makes the motor product thickness smaller to make the motor M smaller and lighter.

In this way, reducing the gap length by eliminating the cylindrical magnet holder part 210' or minimizing the short-circuiting of the magnetic flux by making the magnet 22 a flux focusing type like a Halbach array causes an increase in the magnetic flux density by the magnet 22, allowing an increase in torque, an increase in efficiency, and a reduction in size and weight.

Therefore, if the motor M is applied to a field in which miniaturization and weight reduction are important, such as a high-power density motor for aircrafts and automobiles, miniaturization and weight reduction can be achieved, and use as a motor that can operate even in a temperature environment with a large temperature difference is possible because of the above-described mechanical holding structure.

As described above, the magnet 22 of the present embodiment includes the permanent magnet units 22*a* each including a main pole piece 221 and auxiliary pole pieces 222. The main pole piece 221 is composed of the permanent magnet sheets 221*a* with substantially the same thickness stacked in the thickness direction. The auxiliary pole pieces 222 are composed of the permanent magnet sheets 222*a* with substantially the same thickness stacked in the thickness direction and arranged at positions adjacent to the main pole piece 221 with orientation directions different from the orientation direction of the main pole piece 221 thereby to focus the magnetic flux at the main pole piece 221.

In this way, by adopting main pole pieces 221 and auxiliary pole pieces 222 having a stacked structure of permanent magnet sheets 221*a* and 222*a*, the orientation directions can be set more accurately than main pole pieces 221 and auxiliary pole pieces 222 composed of lumps of permanent magnets, and a flux focusing type permanent magnet unit 22*a* having a high magnetic flux density can be easily and appropriately fabricated. Moreover, dividing the magnets reduces the eddy current and thereby reduces the eddy current loss. The resulting temperature drop achieves a high magnetic flux density as a flux focusing magnet such as a Halbach array. Thus, when applied to motors and the like, further miniaturization and higher output can be achieved.

At this time, the permanent magnet sheets 221*a* constituting the main pole piece 221 and the permanent magnet sheets 222*a* constituting the auxiliary pole pieces 222 have the same orientation direction with respect to the sheet coordinate system, so that the main pole piece 221 and the auxiliary pole pieces 222 can be easily fabricated.

Moreover, the permanent magnet sheets 221*a* constituting the main pole piece 221 and the permanent magnet sheets 222*a* constituting the auxiliary pole pieces 222 have the same thickness with respect to the sheet coordinate system, so that the main pole piece 221 and the auxiliary pole pieces 222 can be even more easily fabricated.

The main pole piece 221 is further divided in a direction orthogonal to the thickness direction, and thereby the surface generating eddy current loss becomes smaller. Therefore, the eddy current loss is reduced, the magnetic flux density is increased, and it becomes possible to further miniaturize and increase the output power when applied to motors and the like.

A portion of the external shape of the main pole piece 221 and the auxiliary pole pieces 222 have substantially the same dimensions. As a result, the process of matching the dimensions is simplified, and the fabrication of the permanent magnet unit 22*a* is facilitated.

The permanent magnet unit 22*a* is arranged along the thrust generation direction, and a portion of the rotor core 21 has magnet holders 210 each including a wall-shaped part 210*a* extending in the radial direction or a direction orthogonal to the thrust generation direction between the permanent magnet units 22*a* and 22*a*, and an enlarged part 210*b* extending from the end of the wall-shaped part 210*a* in a direction overlaying the corner portions on the end side of the auxiliary pole pieces 222 of the permanent magnet unit 22*a*.

The structure to hold the permanent magnet unit 22*a* in the enlarged part 210*b* allows the permanent magnet to be held only by the magnetic circuit components of the motor. At this time, by providing the chamfered parts 222*b* at the corner portions of the auxiliary pole pieces 222 of the permanent magnet unit 22*a* to accommodate the enlarged part 210*b*, it is possible to avoid an increase in the gap length between the stator 3 and the mover 2 when applied to motors and the like. When the corner portions are held down by the enlarged part 210*b*, flux leakage through the enlarged part 210*b* is reduced in the case of a flux focusing magnet such as a Halbach array compared with a parallel orientation magnet, so that the permanent magnet unit 22*a* can be appropriately held without greatly impairing the magnetic flux density.

The chamfered parts 222*b* are surfaces tilting along the orientation direction of the auxiliary pole pieces 222 constituting the permanent magnet unit 22*a*, and the enlarged part 210*b* has a tapered shape along the tilting surfaces. Therefore, even when the magnet holder 210 is provided, the magnetic flux does not easily flow through the magnet holder 210 to the rotor core 21, and thus the fundamental wave component of the magnetic flux density by the magnet can be increased.

When such a magnet is applied to the rotor 2 of the motor M, a multipole surface magnet type rotor 2 that is compact and lightweight with high torque and high efficiency can be appropriately constructed, and its use as a motor for aircraft or the like can be greatly expected.

Through a method of manufacturing a magnet, the main pole piece 221 and the auxiliary pole pieces 222 are constructed. The main pole piece 221 is constructed by cutting a stacked body made by stacking the permanent magnet sheets 221*a* in a predetermined direction. The auxiliary pole pieces 222 are constructed by cutting a stacked body made by stacking the permanent magnet sheets 222*a* having an orientation direction that is the same as that of the permanent magnet sheets 221*a* of the main pole piece 221 in a different direction so that the auxiliary pole pieces 222 have an orientation direction different from that of the main pole piece 221 in a motor coordinate system when assembled at positions adjacent to the main pole piece 221.

In this way, the main pole piece 221 and the auxiliary pole pieces 222 having small eddy current losses and different orientation directions when assembled can be easily fabricated in a similar fabrication process. From the point of view of the fabrication method in which the permanent magnet sheets 221*a* and 222*a* having the same orientation with respect to the sheet coordinate system are cut out from different directions, the thickness of the permanent magnet sheets 221*a* and 222*a* need not be the same, and the materials of the permanent magnet sheets 221*a* and 222*a* need not be the same.

When the same jig is used for cutting out the main pole piece 221 and the auxiliary pole pieces 222, a main pole piece 221 and auxiliary pole pieces 222 having the same dimensions can be easily fabricated.

Post-processing such as chamfering, etc., may be performed on the cut-out main pole piece 221 and auxiliary pole pieces 222, if necessary. Even when the final forms are different, the manufacturing process can be simplified by using common processing steps up to a certain point.

Although an embodiment of the present invention was explained above, the specific configuration of each component is not limited to those in the embodiment described above.

The thickness t1 of the permanent magnet sheets 221*a* of the main pole piece 221, and the thickness t2 of the permanent magnet sheets 222*a* of the auxiliary pole pieces 222 may be different.

The magnetic material for the main pole piece 221 and the auxiliary pole pieces 222 may be different. Between the main pole piece 221 and the auxiliary pole pieces 222, by selecting a material having high coercivity for whichever is easily demagnetized and a material having high residual magnetic flux density for whichever is difficult to demagnetized, the magnet 22 can have a high residual magnetic flux density and is difficult to demagnetize.

Figure 8A:
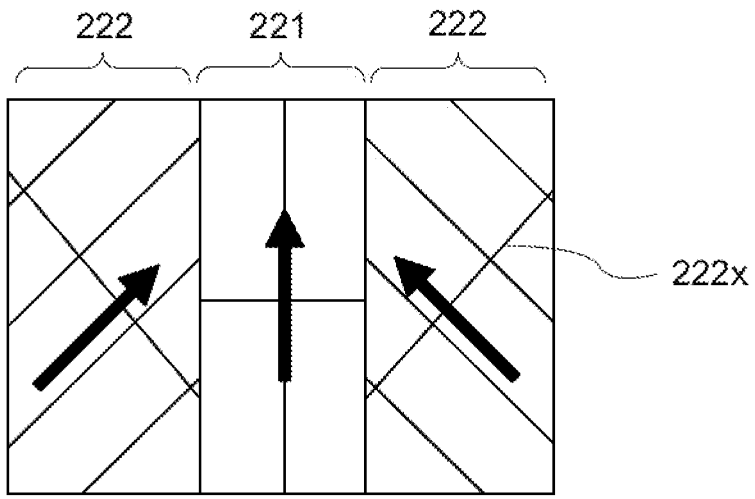
FIGS. 8A and 8B illustrate a modification of the present invention.

In the present embodiment, the main pole piece 221 is divided in the radial direction and the auxiliary pole pieces 222 are not divided, but as illustrated in FIG. 8A, the auxiliary pole pieces 222 may be divided in a direction orthogonal to the orientation direction. By increasing the number of dividing surfaces 222*x*, eddy current losses can be reduced more.

Figure 8B:
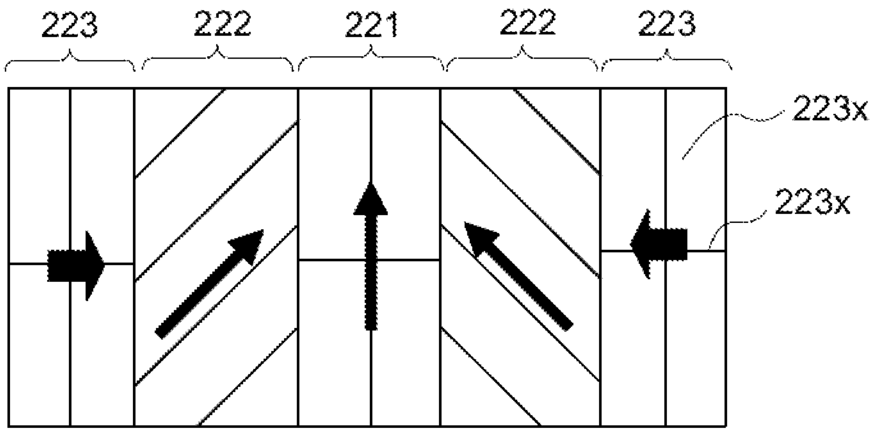

As illustrated in FIG. 8B, second auxiliary pole pieces 223 may be added. In the illustrated example, the orientation direction of the second auxiliary pole pieces 223 is orthogonal to the orientation direction of the main pole piece 221 but alternatively may be an oblique direction (for example, 30, 45, 60, or other degrees). By increasing the number of auxiliary pole pieces 222 and 223 so that the magnetic flux is focused at the main pole piece 221, the magnetic flux density of the magnet can be brought closer to the fundamental component or sine wave. The added auxiliary pole pieces 223 also have dividing surfaces 223*x* that reduce eddy current losses.

Figure 9:
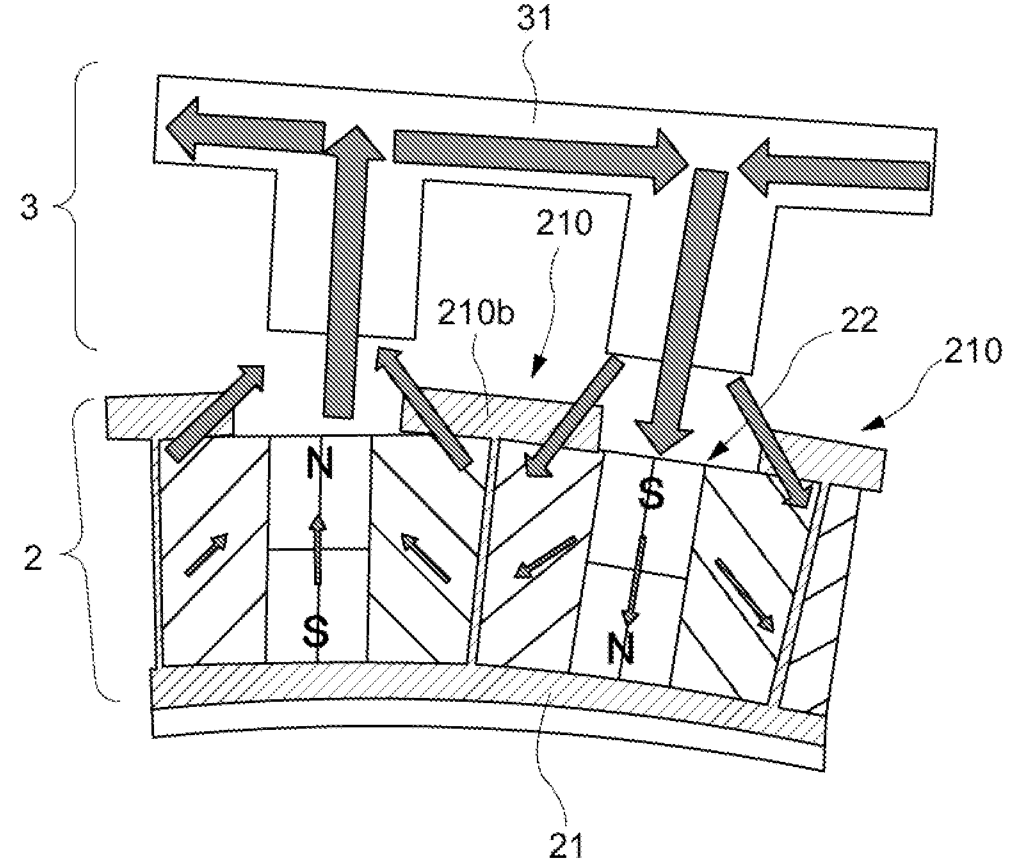
FIG. 9 illustrates another modification of the present invention.

As illustrated in FIG. 9, the enlarged part 210*b* of the magnet holder 210 of the rotor core 21 may not be embedded in the magnet 22. In this way, the magnetic flux density by the magnet 22 is increased because the magnet corner portions do not need to be chamfered. However, when the corner portions of the auxiliary pole pieces are not chamfered, the magnetic flux from the corner portions of the auxiliary pole pieces to the stator core 31 can easily pass through the gap between the stator 3 and the rotor 2 through the enlarged part 210*b* of the magnet holder 210. As a result, the permeability through the gap between the stator 3 and the rotor 2 increases, the inductance increases, and the power factor decreases, so that the application is possible to an acceptable extent.

Furthermore, as illustrated in FIG. 10A1, a magnet holding surface 210*b*1 of the enlarged part 210*b* constituting the magnet holder 210 tapers parallel to the magnetization direction of the auxiliary pole piece 222 constituting the permanent magnet unit 22*a*. In this way, it is difficult for the magnetic flux H to pass through the enlarged part 210*b* constituting the magnet holder 210, and the fundamental wave component of the original magnetic flux density can be increased.

As a comparative example, FIG. 10A2 illustrates the case where the magnet holding surface 210*b*2 of the enlarged part 210*b* constituting the magnet holder 210 is positioned at an angle to the magnetization direction. In this way, the magnetic flux H easily passes through the enlarged part 210*b* constituting the magnet holder 210, and the fundamental wave component of the original magnetic flux density decreases.

In this way, the tapered shape of the magnet holder 210 illustrated in FIG. 10A1 is more effective in preventing short-circuiting of the magnetic flux in terms of the magnetic flux density than the shape of the magnet holder 210 illustrated in FIG. 10A2. However, the effective area for holding the magnet is smaller, and the force for holding the magnet is smaller, so the application is effective to the extent permitted.

As illustrated in FIG. 10B, the wall-shaped part 210*a* constituting the magnet holder 210 may be made into an intermittent structure (comb-shaped) along the direction of the motor shaft m by notching or thinning. This reduces the volume of the magnetic body in the gap between the stator 3 and the rotor 2 illustrated in FIG. 1, so that the inductance is reduced, and the power factor can be improved.

Figure 11:
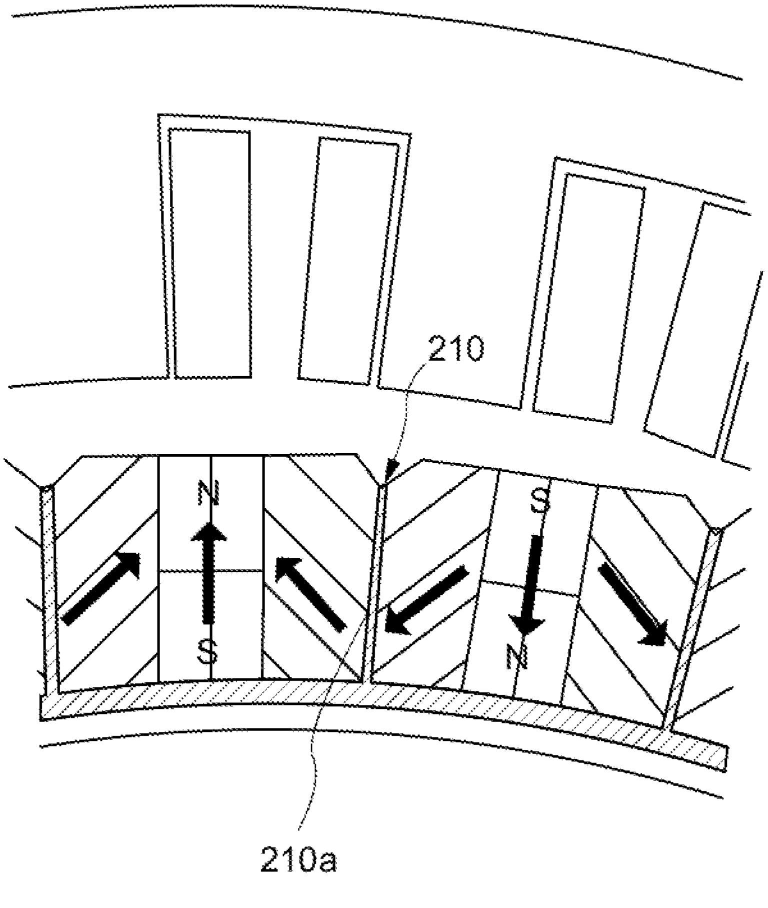
FIG. 11 illustrates another modification of the present invention.

The rotor core 21 and the permanent magnet units 22*a* may be bonded into a holding structure by applying an adhesive agent to the contact surface of the wall-shaped part 210*a* constituting the magnet holder 210 illustrated in FIG. 11 and the auxiliary pole pieces 222 or the contact surface of the outer circumference of the rotor core 21 and the main pole piece 221 or the auxiliary pole pieces 222. By filling the gaps between the permanent magnet units 22*a* and the rotor core 21 with an adhesive agent, collision due to variation of the gap caused by the linear expansion coefficient difference or dimensional tolerance can be prevented between the permanent magnet units 22*a* and the rotor core 21.

Since the wall-shaped part 210*a* of the magnetic pole holder 210 is positioned between the permanent magnet units 22*a* and 22*a* (the auxiliary pole pieces 222 and 222) in this way, the permanent magnet units 22*a* can be easily held. Therefore, when it is possible to hold the magnet by bonding or the like, the magnet holder 210 can be composed of only the wall-shaped part 210*a*, as illustrated in FIG. 11, and the enlarged part can be eliminated to increase the suppression effect of short-circuit magnetic flux.

When the present invention is applied to an outer rotor type motor, the motor may be assembled by bonding the main pole pieces and the auxiliary pole pieces to the inner periphery of the rotor core.

Furthermore, the magnet including the permanent magnet units of the present invention or its fabrication method may be applied to a stator and a mover of linear electric machines such as linear motors.

Figure 12:
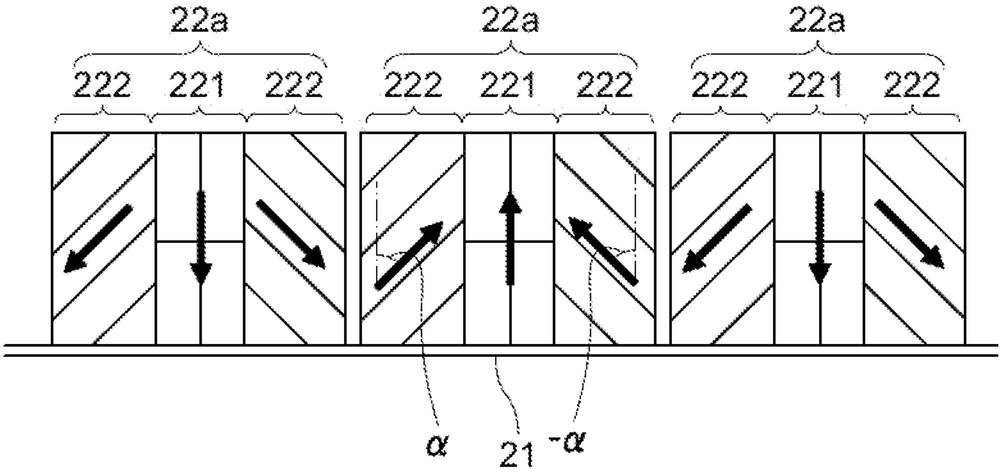
FIG. 12 illustrates another modification of the present invention.

As illustrated in FIG. 12, when the present invention is applied to a linear electric machine, the main pole pieces 221 of the magnet units 22*a* are oriented in a direction orthogonal to the thrust generation direction, which is the extension direction of the core 21, and the auxiliary pole pieces 222 of the magnet units 22*a* are oriented in a direction that forms a predetermined angle (+a, where a is preferably an acute angle) to the orientation direction of the main pole pieces 221. In such case, magnet holders similar to the magnet holders 210 in the above embodiment may be positioned between the magnet units 22*a* and 22*a*.

Various other modifications may be applied to other configurations without departing from the gist of the present invention.

REFERENCE SIGNS LIST

A electric motor (motor)
2 rotor
3 stator
21 rotor core
22 magnet
22*a* permanent magnet unit
210 magnet holder
210*a* wall-shaped part
210*b* enlarged part
221 main pole piece
222 auxiliary pole piece
221*a*, 222*a* permanent magnet sheet

What is claimed is:

1. A magnet comprising a plurality of permanent magnet units, each of the plurality of permanent magnet units comprising:

a main pole piece including permanent magnet sheets with a substantially same first thickness, the permanent magnet sheets of the main pole piece being stacked in a first stacking direction which is in a direction of the first thickness, wherein the first stacking direction of the permanent magnet sheets of the main pole piece crosses a first magnetization direction of the permanent magnet sheets of the main pole piece; and an auxiliary pole piece including permanent magnet sheets with a substantially same second thickness, the permanent magnet sheets of the auxiliary pole piece being stacked in a second stacking direction which is in a direction of the second thickness, wherein the second stacking direction of the permanent magnet sheets of the auxiliary pole piece crosses a second magnetization direction of the permanent magnet sheets of the auxiliary pole piece, wherein the auxiliary pole piece is positioned adjacent to the main pole piece with the second stacking direction and the second magnetization direction of the permanent magnet sheets of the auxiliary pole piece differing from the first stacking direction and the first magnetization direction of the permanent magnet sheets of the main pole piece, with a magnetic flux being focused at the main pole piece, wherein each of the permanent magnet units includes the main pole piece and the auxiliary pole piece joined together, and each of the plurality of the permanent magnet units having the same cross-sectional shape including the main pole piece and the auxiliary pole piece joined together are arranged in a predetermined direction, and wherein the stacked direction and magnetization direction of each permanent magnet sheet are perpendicular to each other in each of the main pole piece and auxiliary pole piece.

2. The magnet according to claim 1, wherein the permanent magnet unit is provided for each pole, is positioned along a thrust generation direction, and includes, in a portion of a core being a thrust generation element, a T-shaped magnet holder including a wall-shaped part extending in a direction orthogonal to the thrust generation direction between the permanent magnet units, and an enlarged part extending from an end of the wall-shaped part in a direction overlaying a corner portion on an end side of each of the permanent magnet units, and wherein the outer peripheral surface of the permanent magnet unit is exposed between adjacent magnet holders.

3. A magnet comprising a plurality of permanent magnet units, each of the plurality of permanent magnet units comprising:

a main pole piece including permanent magnet sheets with a substantially same first thickness, the permanent magnet sheets of the main pole piece being stacked in a first stacking direction which is in a direction of the first thickness, wherein the first stacking direction of the permanent magnet sheets of the main pole piece crosses a first magnetization direction of the permanent magnet sheets of the main pole piece; and an auxiliary pole piece including permanent magnet sheets with a substantially same second thickness, the permanent magnet sheets of the auxiliary pole piece being stacked in a second stacking direction which is in a direction of the second thickness, wherein the second stacking direction of the permanent magnet sheets of the auxiliary pole piece crosses a second magnetization direction of the permanent magnet sheets of the auxiliary pole piece, wherein the auxiliary pole piece is positioned adjacent to the main pole piece with the second stacking direction and the second magnetization direction of the permanent magnet sheets of the auxiliary pole piece differing from the first stacking direction and the first magnetization direction of the permanent magnet sheets of the main pole piece, with a magnetic flux being focused at the main pole piece, wherein each of the permanent magnet units includes the main pole piece and the auxiliary pole piece joined together, and each of the plurality of the permanent magnet units having the same cross-sectional shape including the main pole piece and the auxiliary pole piece joined together are arranged in a predetermined direction, and wherein the magnetization direction of each permanent magnet sheet is aligned in each of the main pole piece and auxiliary pole piece.

4. The magnet according to claim 3, wherein the permanent magnet unit is provided for each pole, is positioned along a thrust generation direction, and includes, in a portion of a core being a thrust generation element, a T-shaped magnet holder including a wall-shaped part extending in a direction orthogonal to the thrust generation direction between the permanent magnet units, and an enlarged part extending from an end of the wall-shaped part in a direction overlaying a corner portion on an end side of each of the permanent magnet units, and wherein the outer peripheral surface of the permanent magnet unit is exposed between adjacent magnet holders.

5. A magnet comprising a plurality of permanent magnet units, each of the plurality of permanent magnet units comprising:

a main pole piece including permanent magnet sheets with a substantially same first thickness, the permanent magnet sheets of the main pole piece being stacked in a first stacking direction which is in a direction of the first thickness, wherein the first stacking direction of the permanent magnet sheets of the main pole piece crosses a first magnetization direction of the permanent magnet sheets of the main pole piece; and an auxiliary pole piece including permanent magnet sheets with a substantially same second thickness, the permanent magnet sheets of the auxiliary pole piece being stacked in a second stacking direction which is in a direction of the second thickness, wherein the second stacking direction of the permanent magnet sheets of the auxiliary pole piece crosses a second magnetization direction of the permanent magnet sheets of the auxiliary pole piece, wherein the auxiliary pole piece is positioned adjacent to the main pole piece with the second stacking direction and the second magnetization direction of the permanent magnet sheets of the auxiliary pole piece differing from the first stacking direction and the first magnetization direction of the permanent magnet sheets of the main pole piece, with a magnetic flux being focused at the main pole piece, wherein each of the permanent magnet units includes the main pole piece and the auxiliary pole piece joined together, and each of the plurality of the permanent magnet units having the same cross-sectional shape including the main pole piece and the auxiliary pole piece joined together are arranged in a predetermined direction, and wherein the magnetization directions of the main poles and an interpole of adjacent magnet units are opposite to each other.

6. The magnet according to claim 5, wherein the permanent magnet unit is provided for each pole, is positioned along a thrust generation direction, and includes, in a portion of a core being a thrust generation element, a T-shaped magnet holder including a wall-shaped part extending in a direction orthogonal to the thrust generation direction between the permanent magnet units, and an enlarged part extending from an end of the wall-shaped part in a direction overlaying a corner portion on an end side of each of the permanent magnet units, and wherein the outer peripheral surface of the permanent magnet unit is exposed between adjacent magnet holders.

* * * * *